(12) United States Patent
Chen et al.

(10) Patent No.: US 10,574,802 B2
(45) Date of Patent: Feb. 25, 2020

(54) HOUSING ASSEMBLY, ELECTRONIC ASSEMBLY MODULE, AND ELECTRONIC DEVICE WITH SAME

(71) Applicant: Chiun Mai Communication Systems, Inc., New Taipei (TW)

(72) Inventors: Chueh-Chuan Chen, New Taipei (TW); Yi-Chieh Miao, New Taipei (TW); Meng-Jer Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/244,495

(22) Filed: Jan. 10, 2019

(65) Prior Publication Data
US 2019/0238668 A1  Aug. 1, 2019

(30) Foreign Application Priority Data
Jan. 12, 2018 (CN) .......................... 2018 1 0032475

(51) Int. Cl.
*H04M 1/02* (2006.01)
*G06F 1/16* (2006.01)
(Continued)

(52) U.S. Cl.
CPC ........ *H04M 1/0264* (2013.01); *G06F 1/1686* (2013.01); *H04M 1/0277* (2013.01);
(Continued)

(58) Field of Classification Search
CPC .. H04M 1/0264; H04M 1/0277; H04N 5/225; H04N 5/2252; H04N 5/2257;
(Continued)

(56) References Cited

U.S. PATENT DOCUMENTS 8,369,702 B2 * 2/2013 Sanford ................. G03B 17/12
396/429
2013/0242183 A1 * 9/2013 Lee ........................ G03B 17/02
348/374
(Continued)

FOREIGN PATENT DOCUMENTS

CN        2894120 Y      4/2007
CN      206294254 U      6/2017

OTHER PUBLICATIONS

Yi et al, "Shells assembly, two camera module and mobile terminal", Google translation of CN 206294254 (Year: 2017).*

*Primary Examiner* — Mong-Thuy T Tran
(74) *Attorney, Agent, or Firm* — ScienBiziP, P.C.

(57) ABSTRACT

A housing assembly able to provide precise and adjustable mounting of a camera module. The holder is on the first housing and a first groove is formed on a surface of the holder away from the first housing. An inclined surface is formed on an end of the holder which corresponding to the first side wall. The second housing is mounted on the holder. A protrusion is formed on a surface of the second housing toward the holder. The protrusion protrudes from the surface of the second housing. A second groove is formed on the protrusion. One end of the holder formed with the inclined surface is received it the second groove. The inclined surface abuts against the second side wall to adjust the alignment relationship between the holder and the second housing. An electronic assembly module and an electronic device with the electronic assembly module is also provided.

11 Claims, 6 Drawing Sheets

(51) Int. Cl.
  *H04N 5/225*  (2006.01)
  *H04N 5/232*  (2006.01)
  *H04N 7/14*   (2006.01)

(52) U.S. Cl.
  CPC ......... *H04N 5/2252* (2013.01); *H04N 5/2257* (2013.01); *H04N 5/2258* (2013.01); *H04N 5/23258* (2013.01); *H04N 2007/145* (2013.01)

(58) Field of Classification Search
  CPC ......... H04N 5/23258; H04N 2007/145; H04N 5/2258; G06F 1/1686; G03B 2217/005
  USPC .......................................... 455/575.1, 575.4
  See application file for complete search history.

(56) References Cited

U.S. PATENT DOCUMENTS

| | | | | |
|---|---|---|---|---|
| 2016/0345447 | A1* | 11/2016 | Kraz ..................... | G08B 17/113 |
| 2017/0064172 | A1* | 3/2017 | Vittu .................... | H04N 5/2253 |
| 2017/0186163 | A1* | 6/2017 | Kim ..................... | H04N 5/2258 |
| 2017/0310861 | A1* | 10/2017 | Wang ................... | H04N 5/2254 |
| 2017/0353634 | A1* | 12/2017 | Kim ....................... | G02B 5/005 |
| 2017/0353640 | A1* | 12/2017 | Wang ..................... | G03B 13/36 |
| 2019/0004328 | A1* | 1/2019 | Lee ....................... | G02B 27/646 |

\* cited by examiner

HOUSING ASSEMBLY, ELECTRONIC ASSEMBLY MODULE, AND ELECTRONIC DEVICE WITH SAME

FIELD

The subject matter herein generally relates to a housing assembly, an electronic assembly module and an electronic device with same.

BACKGROUND

More and more electronic devices are equipped with image-capturing function. However, in the process of mounting the camera module to the electronic device, poor alignment between the camera module and the housing usually occurs, which affects the image-capturing ability of the camera.

BRIEF DESCRIPTION OF THE DRAWINGS

Embodiments of the present disclosure will now be described, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures, and components have not been described in detail so as not to obscure the related relevant feature being described. Further, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 1:
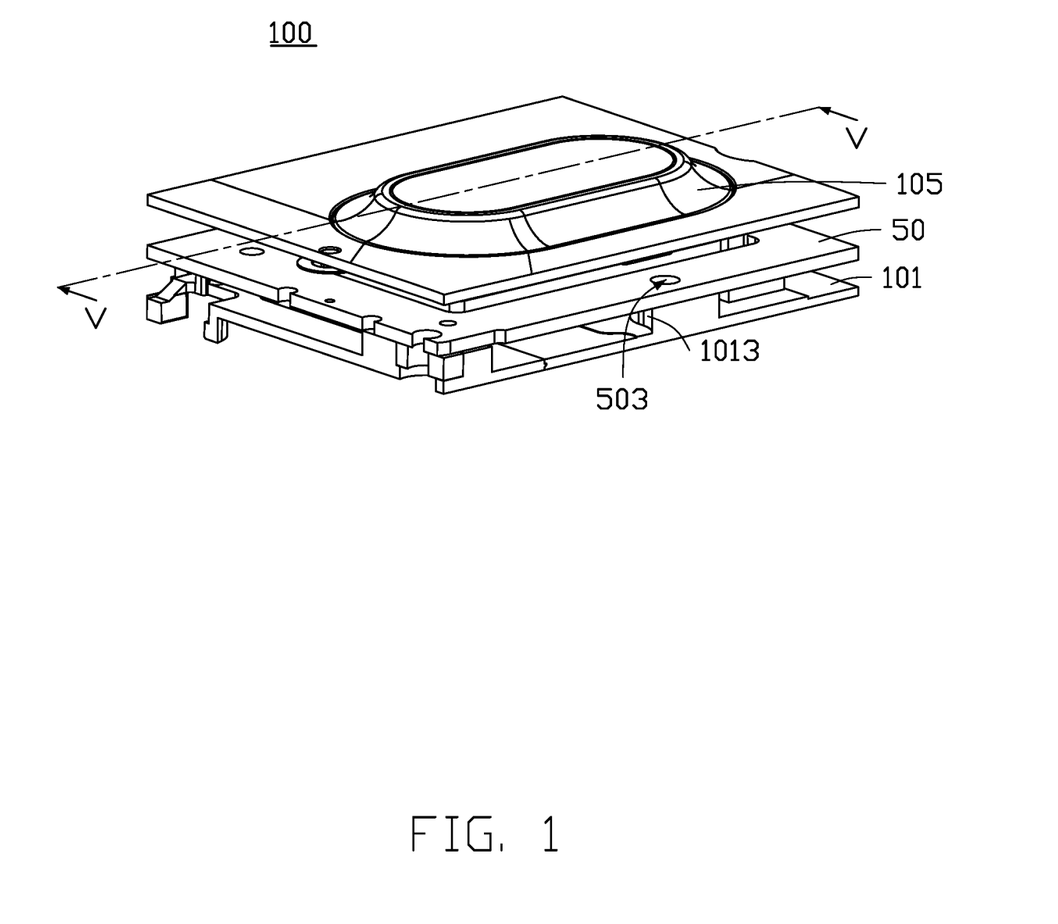
FIG. 1 is a view of an embodiment of an electronic device.
Figure 2:
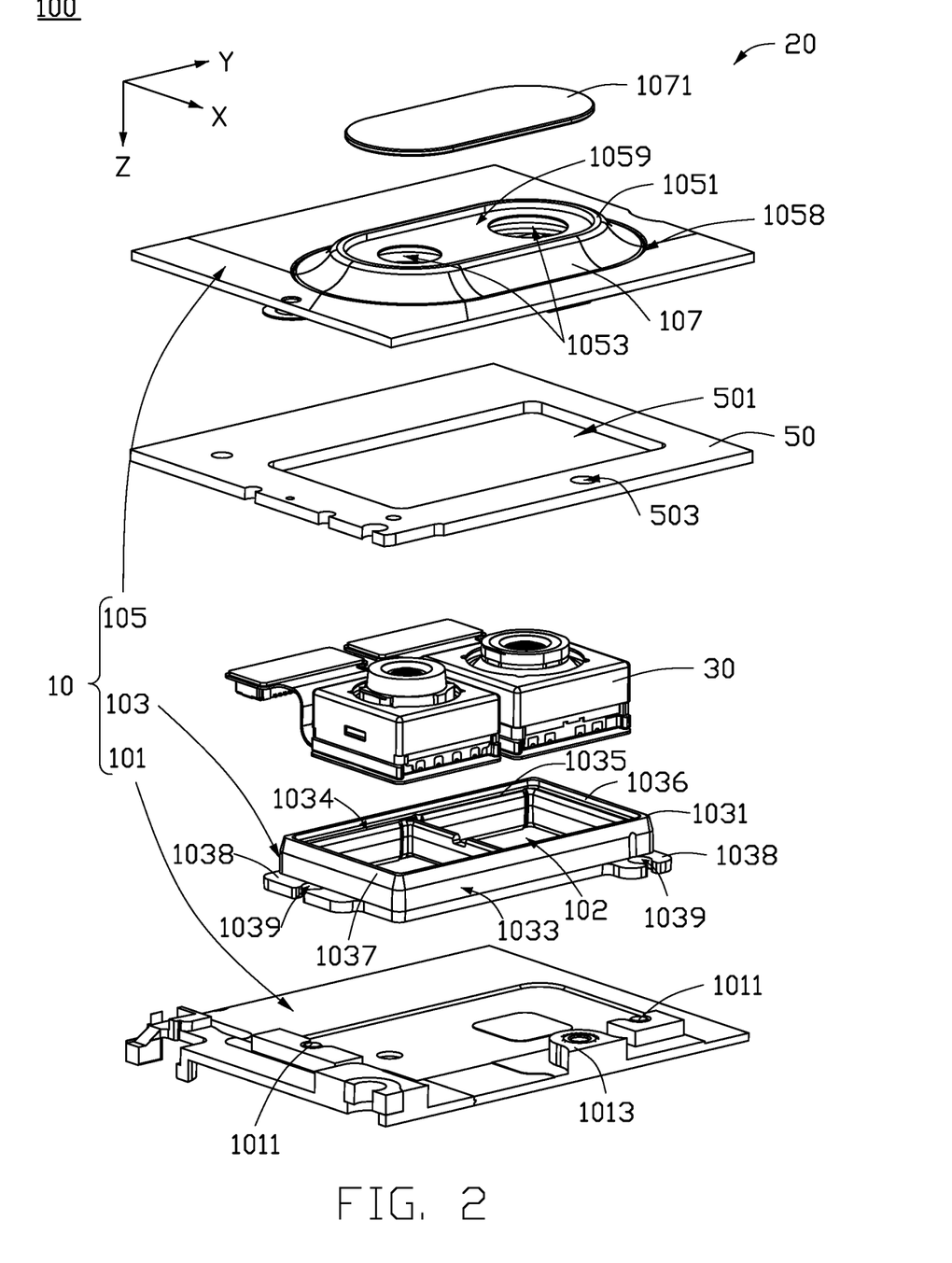
FIG. 2 is an exploded perspective view of the electronic device in FIG. 1.

FIG. 1 and FIG. 2 illustrate an electronic device 100 according to an embodiment. The electronic device 100 can be a mobile phone, a tablet, a camera, or the like. In this embodiment, the electronic device 100 is a mobile phone.

The electronic device 100 includes a housing assembly 10, an electronic assembly 30, and a circuit board 50.

The housing assembly 10 includes a first housing 101, a holder 103, and a second housing 105.

Figure 3:
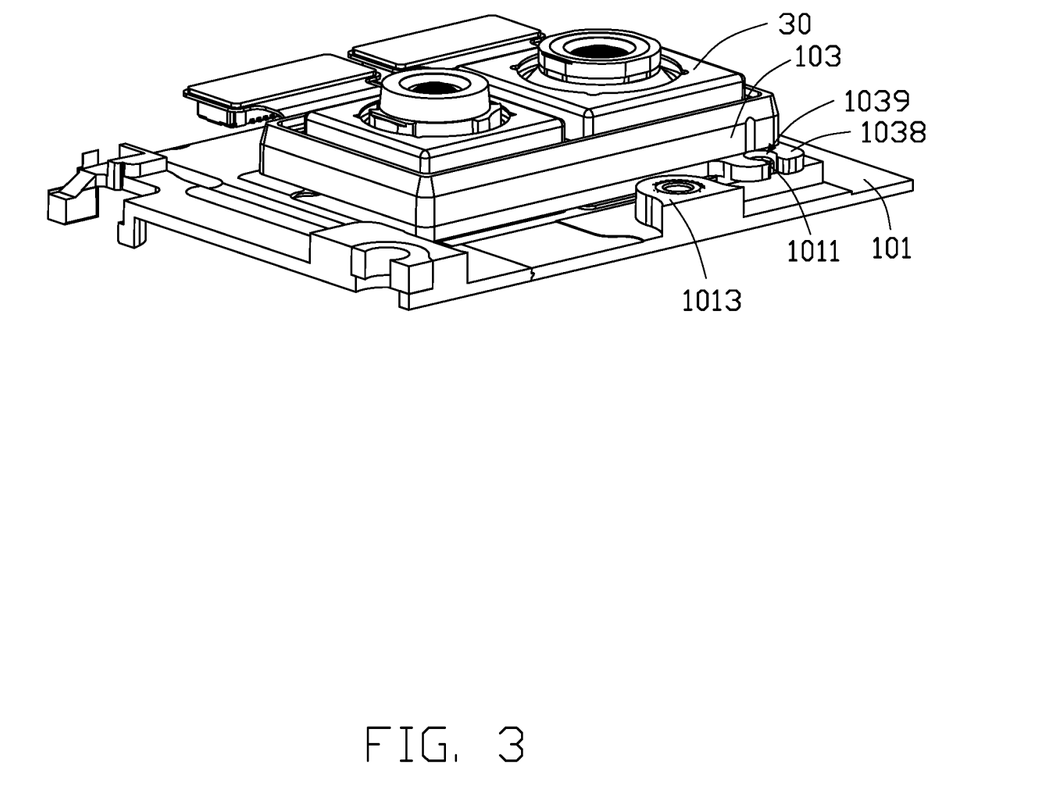
FIG. 3 is a view of part of the electronic device in FIG. 1.

Referring to FIG. 3, the holder 103 is positioned on the first housing 101. In this embodiment, the first housing 101 is a middle frame. The first housing 101 is provided with at least two limiting posts 1011. Each of the limiting posts 1011 has a columnar structure. The limiting posts 1011 assist in pre-fixing the holder 103 to a position of the first housing 101. In other embodiments, each of the limiting posts 1011 can be other structure such as a rectangular parallelepiped, a truncated cone, and the like.

One side of the first housing 101 is further provided with a mounting hole 1013. In this embodiment, the mounting hole 1013 is a threaded hole.

Figure 4:
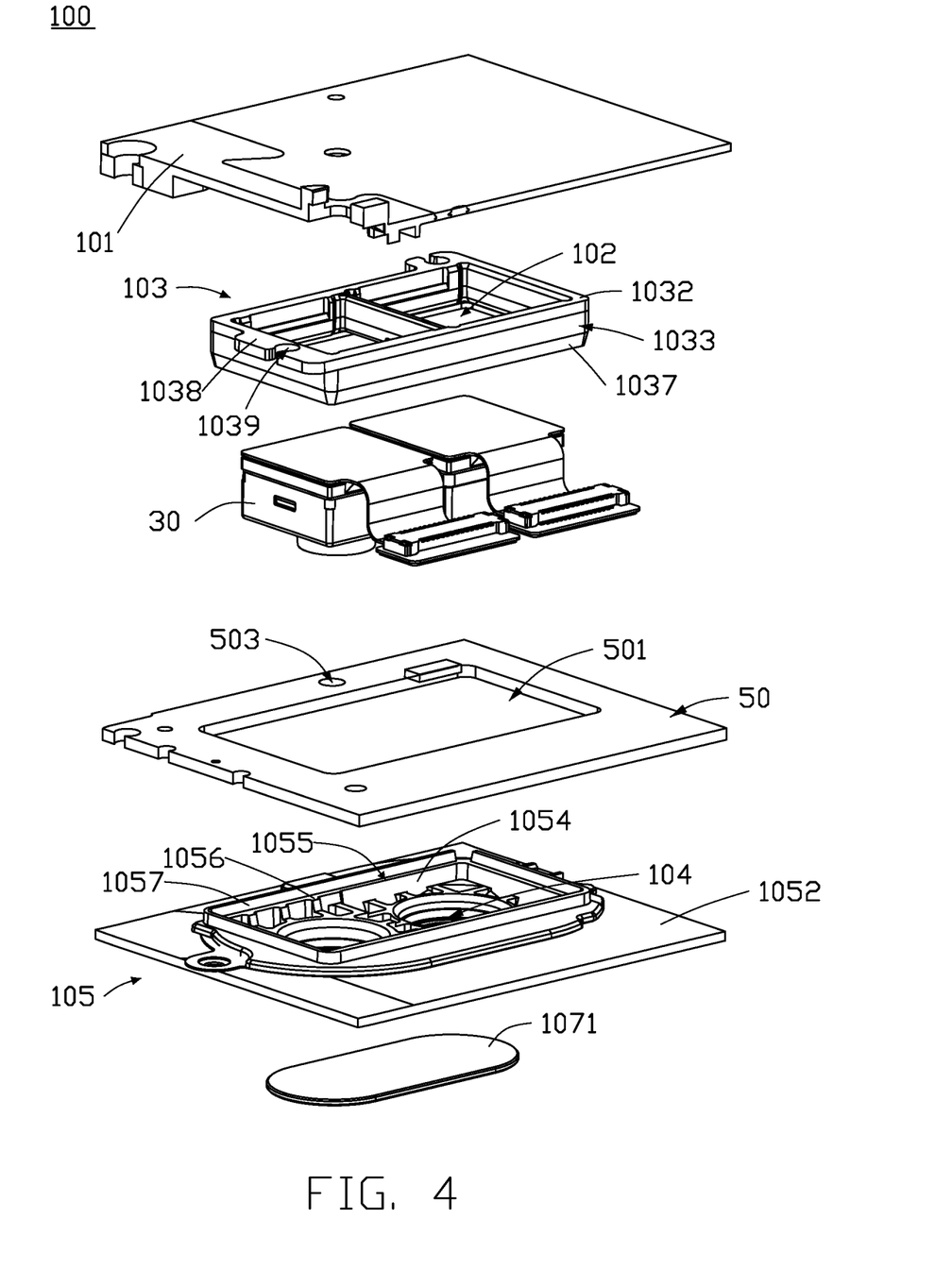
FIG. 4 is another exploded perspective view of the electronic device in FIG. 1.

Referring to FIG. 4, in this embodiment, the holder 103 includes a top surface 1031, a bottom surface 1032, and a peripheral wall 1033. The top surface 1031 and the bottom surface 1032 are on two opposite sides of the holder 103, and the peripheral wall 1033 is connected between the top surface 1031 and the bottom surface 1032. The holder 103 further includes a first accommodating space 102. The top surface 1031 is recessed downwardly toward the bottom surface 1032 to form the first accommodating space 102. The holder 103 has a circular structure or a square structure.

In this embodiment, the holder 103 further defines a first groove 1034 (in FIG. 2). One side of the peripheral wall 1033 adjacent to the first accommodating space 102 is recessed to form the first groove 1034. The first groove 1034 surrounds the outside of the first accommodating space 102, and the first groove 1034 is substantially annular. The first groove 1034 has a substantially stepped cross section. Specifically, the first groove 1034 includes a first bottom wall 1035 and a first side wall 1036. An inclined surface 1037 is formed on an end of the peripheral wall 1033 which corresponds to the first side wall 1036. An angle A is formed between the top surface 1031 and the inclined surface 1037 (refer to FIG. 5). The angle A is not a right angle.

Further, at least two mating sections 1038 are disposed on the holder 103. The peripheral wall 1033 extends outwardly to form the mating sections 1038. The mating sections 1038 assist in pre-fixing the holder 103 to the first housing 101, preventing the holder 103 from excessively deviating from the required position on the first housing 101 during installation.

Figure 6:
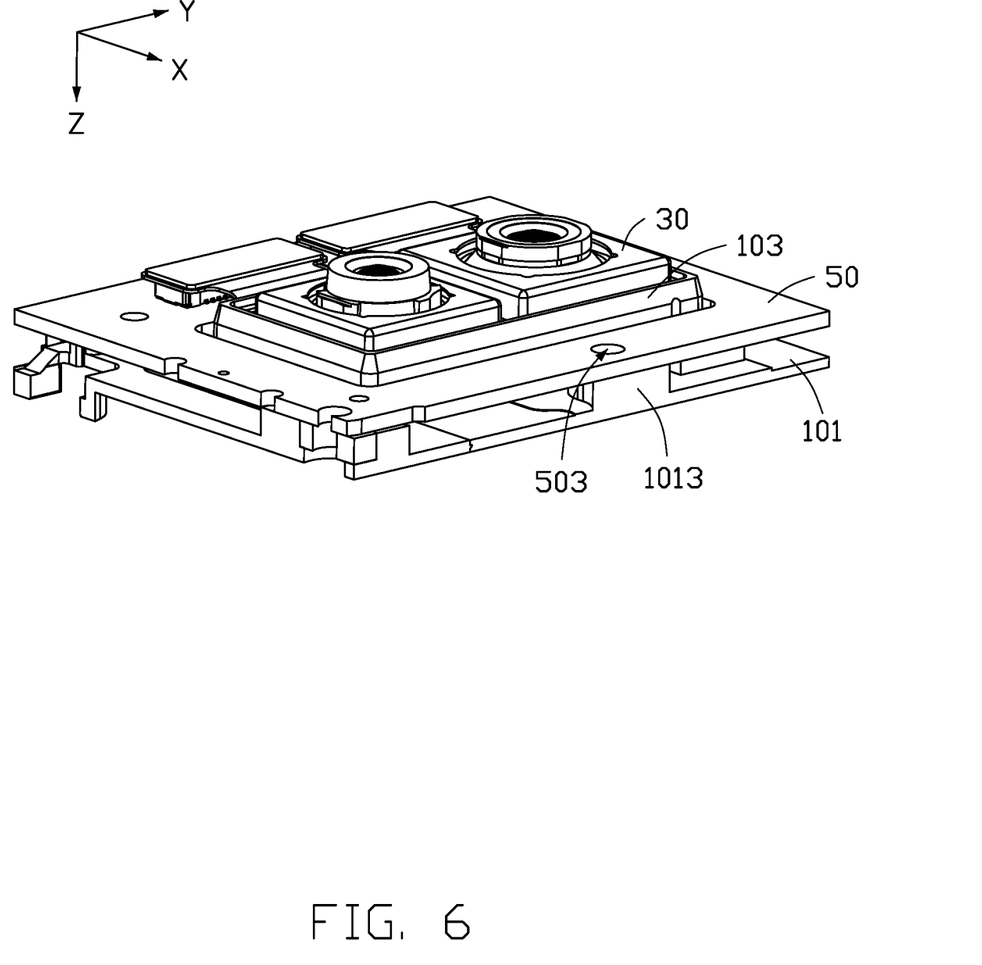
FIG. 6 is another view of part of the electronic device in FIG. 1.

In this embodiment, each of the mating sections 1038 has a sheet structure, and a gap 1039 is formed on the mating section 1038. The gap 1039 is substantially C-shaped. The gap 1039 matches the limiting post 1011. When the holder 103 is assembled to the first housing 101, the gap 1039 is aligned with the limiting post 1011, and the limiting post 1011 is passed through and received in the gap 1039. The gap 1039 being substantially C-shaped and the size of the gap 1039 being larger than the size of the limiting post 1011, the holder 103 is movable relative to the limiting post 1011 in a first direction such as an X-axis direction as shown in FIG. 6 and in a second direction such as a Y-axis direction as shown in FIG. 6 when the limiting post 1011 is received in the gap 1039. Such movability allows adjustment of the position of the holder 103 on the first housing 101, In this embodiment, the first direction is perpendicular to the second direction.

Figure 5:
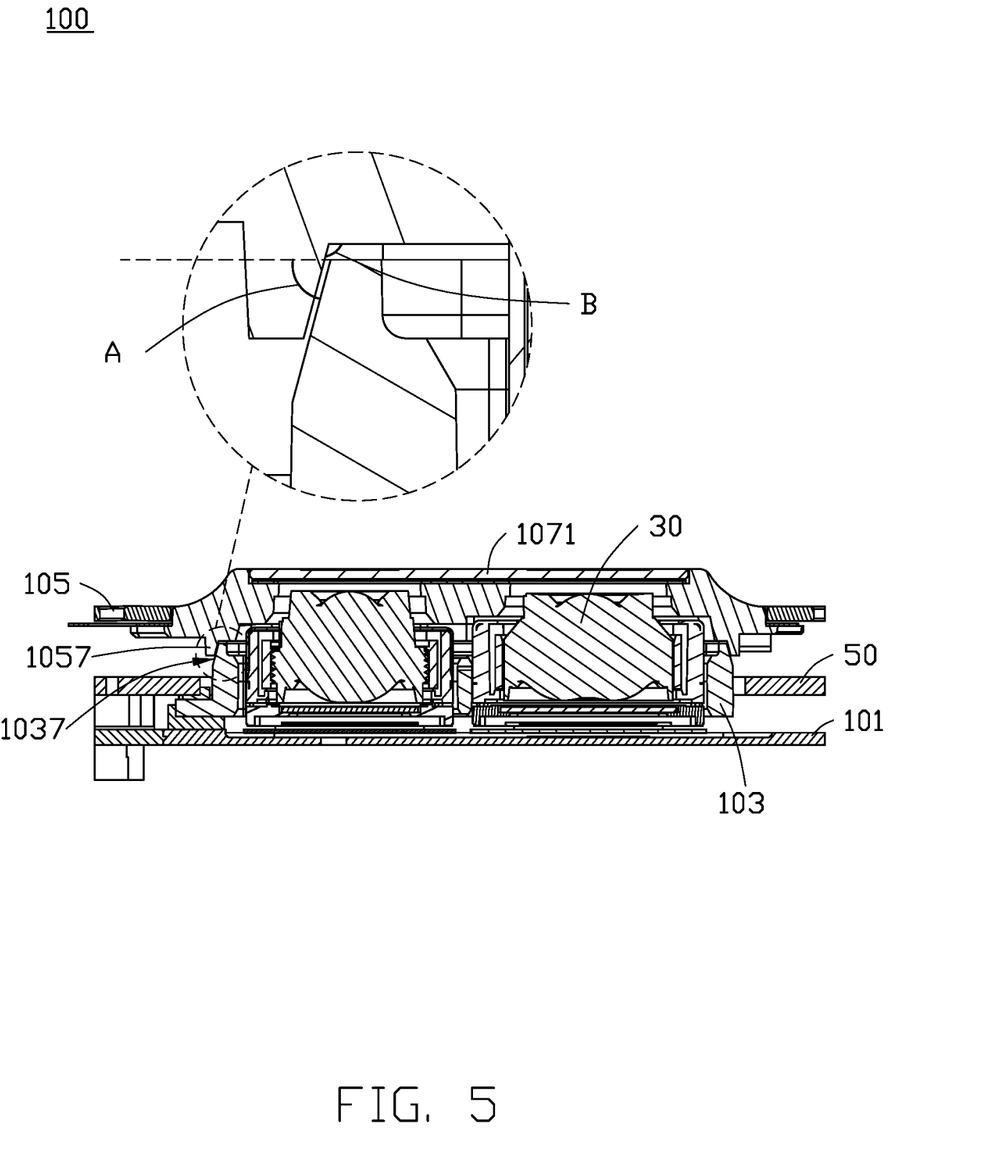
FIG. 5 is a cross-sectional view of the electronic device taken along line V-V in FIG. 1.

Referring to FIG. 5, in this embodiment the second housing 105 can be a back cover of the electronic device 100. The second housing 105 is mounted on the holder 103. Specifically, the second housing 105 includes an outer surface 1051 and an inner surface 1052. The outer surface 1051 and the inner surface 1052 are on two opposite sides of the second housing 105. The second housing 105 further includes a second accommodating space 104. The inner surface 1052 is recessed toward the outer surface 1051 and penetrates the inner surface 1052 to form the second accommodating space 104 together with the outer surface 1051. The second accommodating space 104 receives the holder 103. The first accommodating space 102 receives the electronic assembly 30.

The second housing 105 is further provided with a through hole 1053 which penetrates the outer surface 1051 and the inner surface 1052, and the through hole 1053 communicates with the second accommodating space 104.

A protrusion 1054 is formed on the inner surface 1052. The protrusion 1054 is annular, and protrudes from the inner surface 1052. Specifically, the inner wall of the protrusion 1054 is recessed toward the second accommodating space 104 to form a second groove 1055. The second groove 1055 is substantially annular, and has a substantially stepped cross section. The second groove 1055 includes a second bottom wall 1056 and a second side wall 1057. An angle B is formed between the second bottom wall 1056 and the second side wall 1057 (referring to FIG. 5). The angle B is not a right angle. In this embodiment, the angle B is a C angle of chamfer. In another embodiment, the angle B is an R angle of chamfer.

In this embodiment, one end of the holder 103 formed with the inclined surface 1037 is received in the second groove 1055, and the inclined surface 1037 abuts against the second side wall 1057. The alignment between the holder 103 and the second housing 105 can thereby be adjusted. The electronic assembly 30 in the first accommodating space 102 can thus be accurately positioned with the through hole 1053, and the second housing 105 can be connected with the holder 103. Further, the top surface 1031 of the holder 103 can also abut against the second bottom wall 1056 of the second groove 1055 to reinforce the connection between the holder 103 and the second housing 105. The above-mentioned alignment is two-dimensional.

In this embodiment, the electronic assembly 30 is a dual camera assembly. The electronic assembly 30 is mounted on the first accommodating space 102, and is partially exposed from the through hole 1053 through the second accommodating space 104. The electronic assembly 30 and the housing assembly 10 together form an electronic assembly module 20.

In another embodiment, the electronic assembly 30 is not limited to the dual camera assembly, the electronic assembly 30 can be single camera assembly, proximity sensor, flash, or other electronic component or module.

It can be understood that when the electronic assembly 30 is a dual camera assembly, the housing assembly 10 further includes a protective cover 107, The protective cover 107 protects the electronic assembly 30. In this embodiment, the protective cover 107 forms a part of the second housing 105. The protective cover 107 is disposed on the second housing 105. Specifically, the second housing 105 is provided with an opening 1058. The opening 1058 extends through the outer surface 1051 and the inner surface 1052. The protective cover 107 is disposed on the second housing 105 through the opening 1058. The protective cover 107 can be pre-processed and mounted on the second housing 105. The protective cover 107 and the protrusion 1054 of the second housing 105 form an integral structure.

Further, the protective cover 107 is recessed inwardly from the surface of the holder 103 to form a receiving groove 1059. The through hole 1053 is through the bottom surface of the receiving groove 1059. The receiving groove 1059 accommodates a cover sheet 1071. In this embodiment, the cover sheet 1071 is made of a transparent material, such as a glass. The cover sheet 1071 is received in the receiving groove 1059, which is flush with the surface of the protective cover 107 to ensure good aesthetics of the second housing 105 and ensure normal image-shooting of the dual camera assembly.

Referring to FIG. 6, in this embodiment, the circuit board 50 is disposed on the holder 103 and electrically connected to the electronic assembly 30. Specifically, the circuit board 50 is provided with a through opening 501. The through opening 501 corresponds to the holder 103. The through opening 501 is configured to pass through the holder 103 on which the electronic assembly 30 is mounted, so that the circuit board 50 is disposed on the mating section 1038, and the electronic assembly 30 is exposed from a side of the circuit board 50 away from the first housing 101. As such, the mating section 1038 is sandwiched between the first housing 101 and the circuit board 50.

In this embodiment, in addition to providing electrical connection with the electronic assembly 30, the circuit board 50 assists the holder 103 to be fixed in the third direction (for example, the Z-axis direction). The third direction is perpendicular to both the first direction and the second direction.

Specifically, the circuit board 50 is provided with an assembly hole 503. The assembly hole 503 is matched with the mounting hole 1013. As such, when the holder 103 is mounted in position of the first housing 101, the electronic assembly 30 is fixed to the first housing 101 by passing a fastening member (for example, a screw) through the assembly hole 503 and the mounting hole 1013.

The assembly process of the electronic device 100 includes: firstly, the holder 103 is pre-fixed to the limiting post 1011 on the first housing 101 through the mating section 1038. Next, the electronic assembly 30 is received in the first accommodating space 102 of the holder 103. Then, the circuit board 50 is aligned with the holder 103, and the holder 103 carrying the electronic assembly 30 passes through the circuit board 50, such that the edge of the circuit board 50 abuts the mating section 1038. Further, the second housing 105 is coupled to the holder 103, so that the inclined surface 1037 of the holder 103 slides into the second groove 1055 and abuts against the second groove 1055, to adjust the alignment between the holder 103 and the second housing 105. After the alignment is adjusted if required, the fixing and assembling of the electronic device 100 are completed by the mounting member passing through the assembly hole 503 of the circuit board 50 and the mounting hole 1013 of the first housing 101.

In summary, the holder 103 is pre-fixed on the first housing 101, and the second housing 105 is mounted on the holder 103. The inclined surface 1037 of the holder 103 slides into the second groove 1055 and abuts against the second side wall 1057 to precisely adjust the alignment of the holder 103 and the second housing 105, so that the electronic assembly 30 received in the first accommodating space 102 can be accurately positioned with the through hole 1053. In addition, when the electronic assembly 30 is a dual camera assembly, the dual camera assembly and the through hole 1053 can be aligned accurately, ensuring precise mounting of the dual camera assembly.

It is to be understood, however, that even through numerous characteristics and advantages of the this disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A housing assembly comprising:
   a first housing;
   a holder positioned on the first housing, wherein a first groove is formed on a surface of the holder which is away from the first housing, the first groove comprises a first bottom wall and a first side wall, an inclined surface is formed on an end of the holder which corresponding to the first side wall; and
   a second housing mounted on the holder, wherein a protrusion is formed on a surface of the second housing toward the holder, the protrusion protrudes from the surface of the second housing, a second groove is formed on the protrusion, the second groove comprises a second side wall, the end of the holder formed with the inclined surface is received in the second groove, the inclined surface abuts against the second side wall to adjust an alignment relationship between the holder and the second housing;
   wherein the holder is provided with at least two mating sections, the first housing is provided with at least two limiting posts, the at least two mating sections match the at least two limiting posts, and the at least two limiting posts are correspondingly disposed in the at least two mating sections to mount the holder on the first housing, a gap is formed on each of the at least two mating sections and receives one of the at least two limiting posts, a size of the gap is greater than a size of the matched limiting post, the holder is movable relative to the at least two limiting posts.

2. The housing assembly of claim 1, wherein the alignment relationship between the holder and the second housing is an alignment relationship in a two-dimensional direction.

3. The housing assembly of claim 1, wherein the second housing is a back cover.

4. An electronic assembly module comprising:
   an electronic assembly; and
   a housing assembly comprising:
      a first housing;
      a holder positioned on the first housing, wherein the holder comprises a first accommodating space configured for receiving the electronic assembly, a first groove is formed on a surface of the holder which is away from the first housing, the first groove comprises a first bottom wall and a first side wall, an inclined surface is formed on an end of the holder which corresponding to the first side wall; and
      a second housing mounted on the holder, wherein the second housing comprises a second accommodation space configured for receiving the holder, a protrusion is formed on a surface of the second housing toward the holder, the protrusion protrudes from the surface of the second housing, a second groove is formed on the protrusion, the second groove comprises a second side wall, the end of the holder formed with the inclined surface is received in the second groove, the inclined surface abuts against the second side wall to adjust an alignment relationship between the holder and the second housing;
   wherein the holder is provided with at least two mating sections, the first housing is provided with at least two limiting posts, the at least two mating sections match the at least two limiting posts, and the at least two limiting posts are correspondingly disposed in the at least two mating sections to mount the holder on the first housing, a gap is formed on each of the at least two mating sections and receives one of the at least two limiting posts, a size of the gap is greater than a size of the matched limiting post, the holder is movable relative to the at least two limiting posts.

5. The electronic assembly module of claim 4, wherein the alignment relationship between the holder and the second housing is an alignment relationship in a two-dimensional direction.

6. The electronic assembly module of claim 4, wherein the second housing is a back cover.

7. The electronic assembly module of claim 4, wherein the electronic assembly is one of a camera assembly, a flash and a proximity sensor.

8. The electronic assembly module of claim 4, wherein the holder comprises a top surface, an bottom surface and a peripheral wall, the top surface and the bottom surface are on two opposite sides of the holder, the peripheral wall is connected between the top surface and the bottom surface, the top surface is recessed downwardly toward the bottom surface to form the first accommodating space, the second housing comprises an outer surface and an inner surface, the outer surface and the inner surface are on two opposite sides of the second housing, the inner surface is recessed toward the outer surface to form a second accommodating space.

9. The electronic assembly module of claim 8, wherein a non-right angle is formed between the top surface and the inclined surface.

10. An electronic device comprising:
    a circuit board; and
    an electronic assembly module comprising:
       an electronic assembly; and
       a housing assembly comprising:
          a first housing;
          a holder positioned on the first housing, wherein the circuit board is disposed on the holder and electrically connected to the electronic assembly, the holder comprises a first accommodating space configured for receiving the electronic assembly, a first groove is formed on a surface of the holder which is away from the first housing, the first groove comprises a first bottom wall and a first side wall, an inclined surface is formed on an end of the holder which corresponding to the first side wall; and
          a second housing mounted on the holder, wherein the second housing comprise a second accommodation space, the second accommodation space is configured for receiving the holder, a protrusion is formed on a surface of the second housing toward the holder, the protrusion protrudes from the surface of the second housing, a second groove is formed on the protrusion, the second groove comprises a second side wall, the end of the holder formed with the inclined surface is received in the second groove, the inclined surface abuts against the second side wall to adjust an alignment relationship between the holder and the second housing;
       wherein the holder is provided with at least two mating sections, the first housing is provided with at least two limiting posts, the at least two mating sections match the at least two limiting posts, and the at least two limiting posts are correspondingly disposed in the at least two mating sections to mount the holder on the first housing, a gap is formed on each of the at least two mating sections and receives one of the at least two limiting posts, a size of the gap is greater than a size of the matched limiting post, the holder is movable relative to the at least two limiting posts.

11. The electronic device of claim 10, wherein the circuit board is disposed on the holder, and the circuit board is configured for mating with the first housing to position the holder to the first housing.

\* \* \* \* \*